United States Patent
Malek et al.

(10) Patent No.: US 9,465,476 B1
(45) Date of Patent: Oct. 11, 2016

(54) ELECTRONIC DEVICE WITH SEAMLESS PROTECTIVE COVER GLASS INPUT

(71) Applicant: Apple Inc., Cupertino, CA (US)

(72) Inventors: Shayan Malek, San Jose, CA (US); Warren Z. Jones, San Jose, CA (US); Dhaval N. Shah, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/498,933

(22) Filed: Sep. 26, 2014

(51) Int. Cl.
*G06F 3/041* (2006.01)
*G06F 1/16* (2006.01)
*G06F 3/02* (2006.01)
*G06F 3/044* (2006.01)

(52) U.S. Cl.
CPC ............ *G06F 3/0414* (2013.01); *G06F 1/1626* (2013.01); *G06F 1/1643* (2013.01); *G06F 3/0202* (2013.01); *G06F 3/044* (2013.01); *G06F 3/0416* (2013.01); *G06F 2203/04105* (2013.01)

(58) Field of Classification Search
CPC .... G06F 3/041; G06F 3/0414; G06F 3/0416; G06F 3/044; G06F 3/0487; G06F 3/0488; G06F 2203/04105; G06F 3/02; G06F 3/0202; G06F 3/0227; G06F 1/16; G06F 1/1613; G06F 1/1626; G06F 1/1637; G06F 1/1643; G06F 1/1652; H03K 17/94; H03K 17/945; H03K 17/969; H03K 17/962; H03K 17/9625; H03K 17/9627; H03K 17/98
See application file for complete search history.

(56) References Cited

U.S. PATENT DOCUMENTS

| | | | |
|---|---|---|---|
| 2006/0181517 A1* | 8/2006 | Zadesky | G06F 3/0414 345/173 |
| 2009/0243817 A1* | 10/2009 | Son | G06F 3/0414 345/173 |
| 2012/0154329 A1* | 6/2012 | Shinozaki | G06F 3/016 345/174 |
| 2014/0078658 A1* | 3/2014 | Rubin | G06F 1/1656 361/679.3 |

* cited by examiner

*Primary Examiner* — Nathan Danielsen
(74) *Attorney, Agent, or Firm* — Downey Brand LLP

(57) ABSTRACT

An electronic device with seamless protective cover glass is disclosed. In the described embodiments, the cover glass is coupled to the housing such that the cover glass or portions of the cover glass move with respect to the housing. This movement can be used as an interface for receiving user inputs that can be used to provide control signals to the electronic device.

20 Claims, 9 Drawing Sheets

ELECTRONIC DEVICE WITH SEAMLESS PROTECTIVE COVER GLASS INPUT

FIELD

The described embodiments relate generally to electronic devices. In particular, the present embodiments relate to protective cover glass and user input for electronic devices.

BACKGROUND

Many electronic devices, such as smart phones, tablet devices, portable media players, gaming devices, and the like, include input devices, such as buttons, near the display of the device to receive user input. Often, these input devices require movable components that operate through a hole in the protective cover glass of the display and front face of the device. Sealing elements are then required to prevent dust, liquid, or other contaminants that could damage internal electrical components from entering the enclosure of the electronic device at the hole in the protective cover glass. These sealing elements may increase the size of the space required for the button or may not seal effectively. Furthermore, input devices that require a hole in the protective cover glass may create aesthetically undesirable gaps or breaks at the mating surfaces of the input device and the protective cover glass.

SUMMARY

In various embodiments of the present invention, an electronic device can include a housing, a seamless protective cover glass, a cover glass movement detector, and a processor. The cover glass is movably coupled to the housing. When a force is applied to the cover glass, the cover glass moves with respect to the housing, and the cover glass movement detector detects user input corresponding to the force and provides a signal corresponding to the user input to the processing element. The processing element interprets the detection signal and provides a control signal to control operation of the portable electronic device.

A method for controlling the operation of a portable electronic device having a housing that carries an operational component and a front side opening having an edge that carries a cover glass is described. The method is carried out by detecting a movement of at least a portion of the cover glass in response to a force applied to an external surface of the cover glass, receiving a cover glass movement detection signal in accordance with the movement of the cover glass, and generating a control signal in response to the detection signal to control operation of the portable electronic device in accordance with a pre-determined interpretation of the detection signal.

A non-transitory computer readable medium for storing computer code executable by a processor used to control an operation of an electronic device having a housing that carries an operational component and a front side opening having an edge that carries a cover glass is described. The non-transitory computer readable medium includes at least computer code for detecting a movement of at least a portion of the cover glass in response to a force applied to an external surface of the cover glass by a sensor, computer code for receiving at the processor a cover glass movement detection signal in accordance with the movement of the cover glass, and computer code for generating a control signal by the processor in response to the detection signal to control operation of the portable electronic device in accordance with a pre-determined interpretation of the detection signal.

Other apparatuses, methods, features and advantages of the disclosure will be or will become apparent to one with skill in the art upon examination of the following figures and detailed description. It is intended that all such additional systems, methods, features, and advantages included within this description be within the scope of the disclosure and be protected by the accompanying claims.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
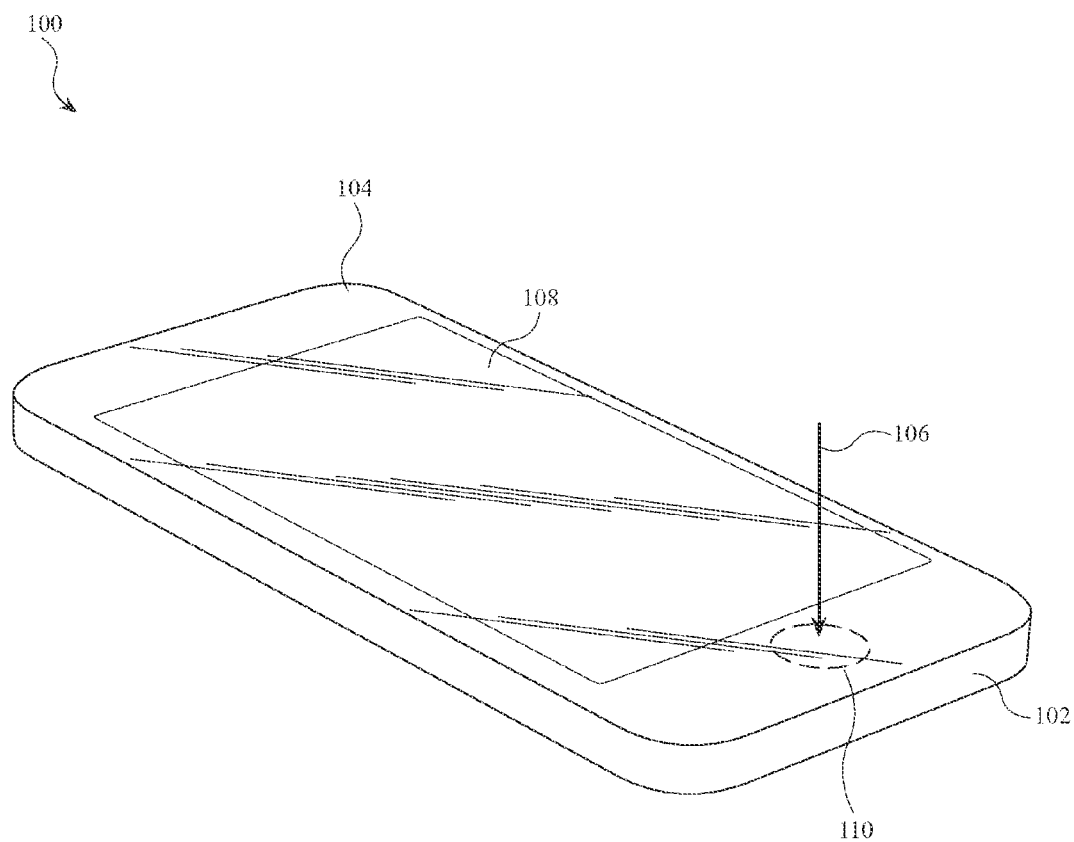
FIG. 1 is a front perspective view of a first example of an electronic device with cover glass that moves with respect to the housing in response to a force applied to the cover glass in accordance with a described embodiment.

Reference will now be made in detail to representative embodiments illustrated in the accompanying drawings. It should be understood that the following descriptions are not intended to limit the embodiments to one preferred embodiment. To the contrary, they are intended to cover alternatives, modifications, and equivalents as can be included within the spirit and scope of the described embodiments as defined by the appended claims. Those skilled in the art will readily appreciate that the detailed description given herein with respect to these Figures is for explanatory purposes only and should not be construed as limiting.

The following discussion is related to a portable electronic device having a housing with walls having edges that define a front opening in which a protective layer is disposed. In the following discussion, the protective layer can be used to protect a display assembly beneath the protective layer in which case the protective layer can be formed of a transparent or translucent material, such as glass. In the described embodiments, the protective layer (hereinafter referred to as a cover glass without loss of generality) is seamless in nature, meaning the cover glass has no joints and is formed of a single substrate. In this regard, the cover glass can provide enhanced protection against contaminant intrusion into the housing and can provide a seamless look which may be aesthetically desirable. Moreover, the cover glass can be attached to the housing such that the cover glass can move with respect to a reference datum. In the following discussion, the reference datum can be defined by or in relation to elements of the electronic device. In the described embodiments, without loss of generality, the reference datum is defined by the edges of the walls of the housing. Movement of the cover glass with respect to the edges of the walls of the housing (hereinafter movement with respect to the housing) can be used as an interface for receiving user inputs that can be used to provide control signals to the portable electronic device.

The manner in which the cover glass is movably coupled to the housing can take many forms. For example, the cover glass can be pivotally attached to the housing using an attachment mechanism along the lines of a hinge or a hinge-like assembly. In this way, the cover glass can take on a pivot action when a user presses on it. That is, the cover glass can have a rotational degree of freedom with respect to the housing such that the cover glass moves accordingly (pivots) when a user presses on it. This pivot action can be used to activate a sensor disposed within the housing resulting in a control signal, or signals, being forwarded to a processor that, in turn, can alter an operation of the portable electronic device accordingly. The mechanism used to sense the movement of the cover glass can take many forms, such as a dome switch, a tact switch, an electrical contact, or the like.

As another example, the cover glass can be connected to the housing using an attachment mechanism along the lines of a compliant material or a plurality of elastic connectors. In this way, the cover glass can take on a rocking action when a user presses on it. That is, the cover glass can have one or more rotational degrees of freedom with respect to the housing, one or more translations degrees of freedom with respect to the housing, or a combination thereof, such that the cover glass can move accordingly (rock) when a user presses on it. Movement of the cover glass can be used to activate one or more sensors disposed within the housing resulting in a control signal, or signals, being forwarded to a processor that, in turn, can alter an operation of the portable electronic device accordingly. The mechanism used to sense the movement of the cover glass can take many forms, such as a dome switch, a tact switch, an electrical contact, or the like.

As yet another example, the cover glass itself can be made of a flexible material or can be machined or otherwise manufactured to be flexible within a certain region. The cover glass can be attached to the housing using a conventional attachment mechanism. In this way, the edges of the cover glass remain fixed with respect to the edges of the housing when a user presses on the cover glass, while interior portions of the cover glass can be locally deformed or deflected when a user presses on the flexible region of the cover glass. This local deformation or deflection can be used to activate a sensor disposed within the housing resulting in a control signal, or signals, being forwarded to a processor that, in turn, can alter an operation of the portable electronic device accordingly. The mechanism used to sense the deformation or deflection of the cover glass can take many forms, such as a strain film, an optical sensor, or the like.

FIG. 1 is a front perspective view of an electronic device 100 in accordance with one embodiment of the invention. It should be noted that electronic device 100 can take many forms such as a smart phone, a tablet device, a portable media player and so on. For example, electronic device 100 can take the form of a smart phone along the lines of an iPhone manufactured by Apple Inc. of Cupertino, Calif. Accordingly, electronic device 100 can be substantially any type of electronic device that includes user input. Electronic device 100 can include housing 102. Housing 102 generally acts to protect the internal components of the electronic device 100. Electronic device components can be retained within housing 102 to provide additional functionality to the electronic device 100. The shape of the housing 102 can take many forms. For example, the shape of the housing 102 can be rectangular or curved in nature. The housing 102 can be made of many materials. For example, the housing 102 can be made of plastic or aluminum with a variety of aesthetic finishes.

Housing 102 can have walls with edges that define a front opening within which cover glass 104 can be disposed. The cover glass 104 can be formed from any suitable transparent or translucent material including, for example, glass or plastic. The cover glass 104 can be movably coupled to the housing 102 such that the cover glass 104 moves with respect to the housing 102 in response to a force 106 applied to the cover glass 104. Specific mechanisms for movably coupling the housing 102 to the cover glass 104 are discussed below.

The cover glass 104 can protect a display assembly 108 beneath the cover glass 104. The display assembly 108 can be any type of component that displays visual output. For example, the display assembly 108 can be a liquid crystal display (LCD), an organic light emitting diode (OLED) display, a plasma display, or the like.

The electronic device 100 can include an indicator 110 at the cover glass to indicate a preferred location for a user to apply a force to the cover glass. In one example, the indicator 110 can be a permanent two-dimensional indicator, such as an inked glyph applied to the undersurface of the cover glass 104. In another example, the indicator can be a permanent three-dimensional indicator, such as a depression or tactile feature machined or otherwise manufactured into the cover glass 104. In yet another example, the indicator can be a temporary indicator displayed on a portion of the active display area 109. It should be noted that since cover glass 104 is seamless in nature, indicator 110 does not require any disruption of cover glass 104 and therefore eliminates potential contaminants from making their way into the interior of electronic device 100.

Figure 2:
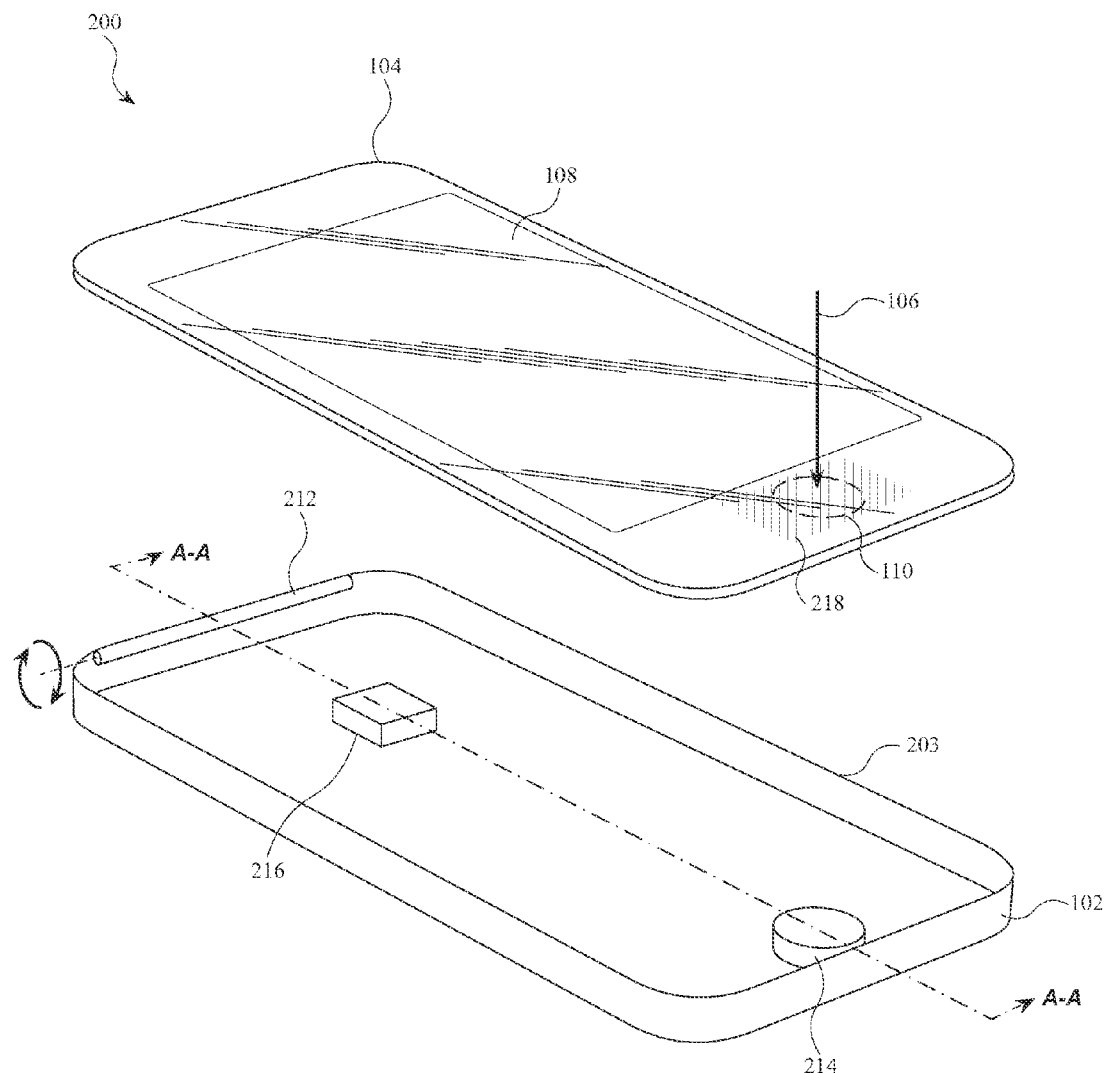
FIG. 2 is an exploded view of a second example of an electronic device in which the cover glass is configured to pivot.

FIG. 2 is an exploded view of a second example of an electronic device 200 in accordance with another embodiment of the invention. The electronic device 200 can include some or all of the features of the electronic device 100 described above. Electronic device 200 can include a housing 102 having walls with edges that define a front opening 203 within which cover glass 104 can be displaced.

Coupling mechanism 212 can couple the cover glass 104 to one edge of the housing 102 such that the cover glass 104 pivots with respect to the housing 102 in response to a force 106 applied to a portion of the cover glass 104. The coupling mechanism 212 can be a hinge or the like. In other embodiments, the cover glass can be coupled to the housing along an axis between a first and second end of the housing such that the cover glass pivots about the axis between the first and second end of the housing. These pivot embodiments allow for the cover glass to have essentially one rotational degree of freedom with respect to the housing such that the cover glass 104 moves accordingly (pivots) when a user presses on it. The movement of the cover glass gives a user a unique haptic feel and feedback system. The amount of possible rotation of the cover glass can be tuned so that the rotation is detectable to a user or so that a desired user experience is achieved.

Cover glass movement detector 214 can be disposed within the housing 102 and can be configured to detect the movement of the cover glass 104 and generate a detection signal in response to the movement of the cover glass 104. The cover glass movement detector 214 can be a dome switch, optical sensor, or the like. A dome switch cover glass movement detector can comprise a flexible dome member and a switch wherein the movement of the cover glass causes the flexible dome member to contact the switch that generates the detection signal. An optical sensor movement detector can comprise a light transmitter directed to transmit light onto a surface of the cover glass and a photoelectric receiver configured to receive the transmitted light that is reflected from the cover glass. The position of a portion of the cover glass can thus be measured with respect to a baseline position, and if the position of the portion of the cover glass is determined to have changed by more than a predetermined amount, the optical sensor can generate the detection signal.

Indicator 110 can indicate a preferred location for a user to apply a force to the cover glass 104. In some embodiments, as in FIG. 2, the indicator 110 would be located away from the axis of rotation of the cover glass. A position of the indicator 110 away from the axis of rotation of the cover glass allows for an increased displacement of the cover glass from its initial position, which may be valuable feedback to a user.

Similarly, in some embodiments, as in FIG. 2, the cover glass movement detector 214, would be located away from the axis of rotation of the cover glass 104. A position of the cover glass movement detector 214 away from the axis of rotation of the cover glass allows for an increased displacement of the cover glass 104 in the vicinity of the cover glass movement detector 214 so movement may be more easily detected or measured by the cover glass movement detector 214.

Processor 216 can be disposed within the housing 102 and can be coupled to the cover glass movement detector 214. The processor 216 can be configured to receive the detection signal from the cover glass movement detector 214, interpret the detection signal, and generate a control signal in accordance with the interpreted detection signal. The control signal can be used to control operation of the portable electronic device.

The processor 216 can be programmed to interpret a variety of different natures of movement detected by the cover glass movement detector 214. These movements include, but are not limited to, opposite movements of the cover glass 104 in close succession (such as that caused by a press and release on the cover glass), movement of the cover glass 104 not closely followed by a second movement (such as that caused by a press and hold on the cover glass), and multiple opposite movements of the cover glass 104 in quick succession (such as that caused by multiple press and release actions on the cover glass).

The control signal generated by the processor 216 can control a variety of operations of the electronic device 200 according to an interpretation of the movement or the nature of the movement of the cover glass 104. Operations of the electronic device 200 that can by controlled by the control signal include, but are not limited to, waking the device from a sleep mode, returning the device to a default "home" screen, launching an application or task manager, or launching a particular application.

In some embodiments, the processor can control for incidental or accidental cover glass movement, for example, caused by forces applied to the cover glass when the device is in a user's pocket or bag. In this case, the cover glass 104 could include touch-sensitive region 218 comprising one or more input sensors such as capacitive-touch sensors, resistive-touch sensors, multi-touch sensors, or the like. Touch-sensitive region 218 can be configured to detect if a user touches the region and to generate a touch event detection signal in response to a touch event at region 218. The processor 216 can be configured to receive the touch event detection signal from touch-sensitive region 218. Processor 216 can control for incidental or accidental movement of the cover glass 104 by producing a control signal only if it substantially concurrently receives a touch event detection signal from the touch sensitive region 218 and a cover glass movement detection signal from the cover glass movement detector 214.

Figure 3A:
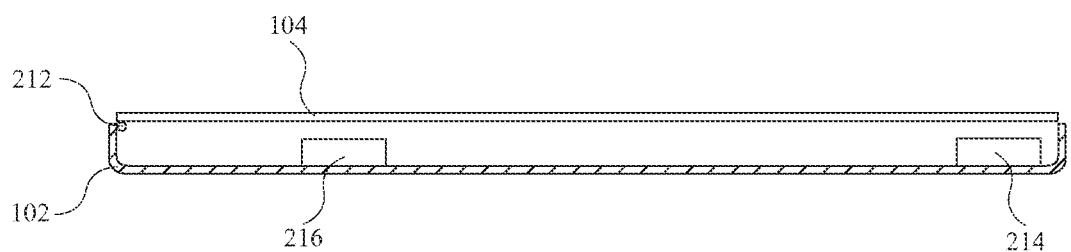
FIG. 3A is cross-sectional view of the electronic device of FIG. 2 taken along line A-A, showing the cover glass in a neutral position.

FIG. 3A is cross-sectional view of the electronic device of FIG. 2 taken along line A-A, showing the cover glass in a neutral position.

Figure 3B:
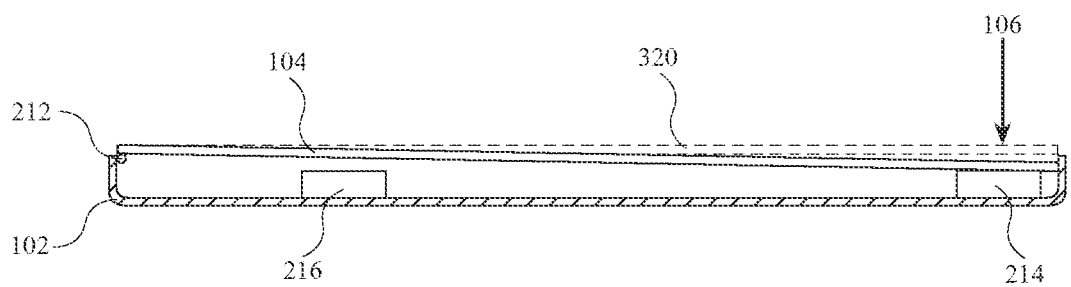
FIG. 3B is cross-sectional view of the electronic device of FIG. 2 taken along line A-A, as user force is applied thereto.

FIG. 3B is cross-sectional view of the electronic device of FIG. 2 taken along line A-A, as user force 106 is applied. The cover glass 104 is displaced from neutral position 320. In some examples, the coupling mechanism 212 can bias the cover glass 104 to return to neutral position 320. In other embodiments, cover glass movement detector 214 can bias the cover glass 104 to return to neutral position 320.

Figure 4:
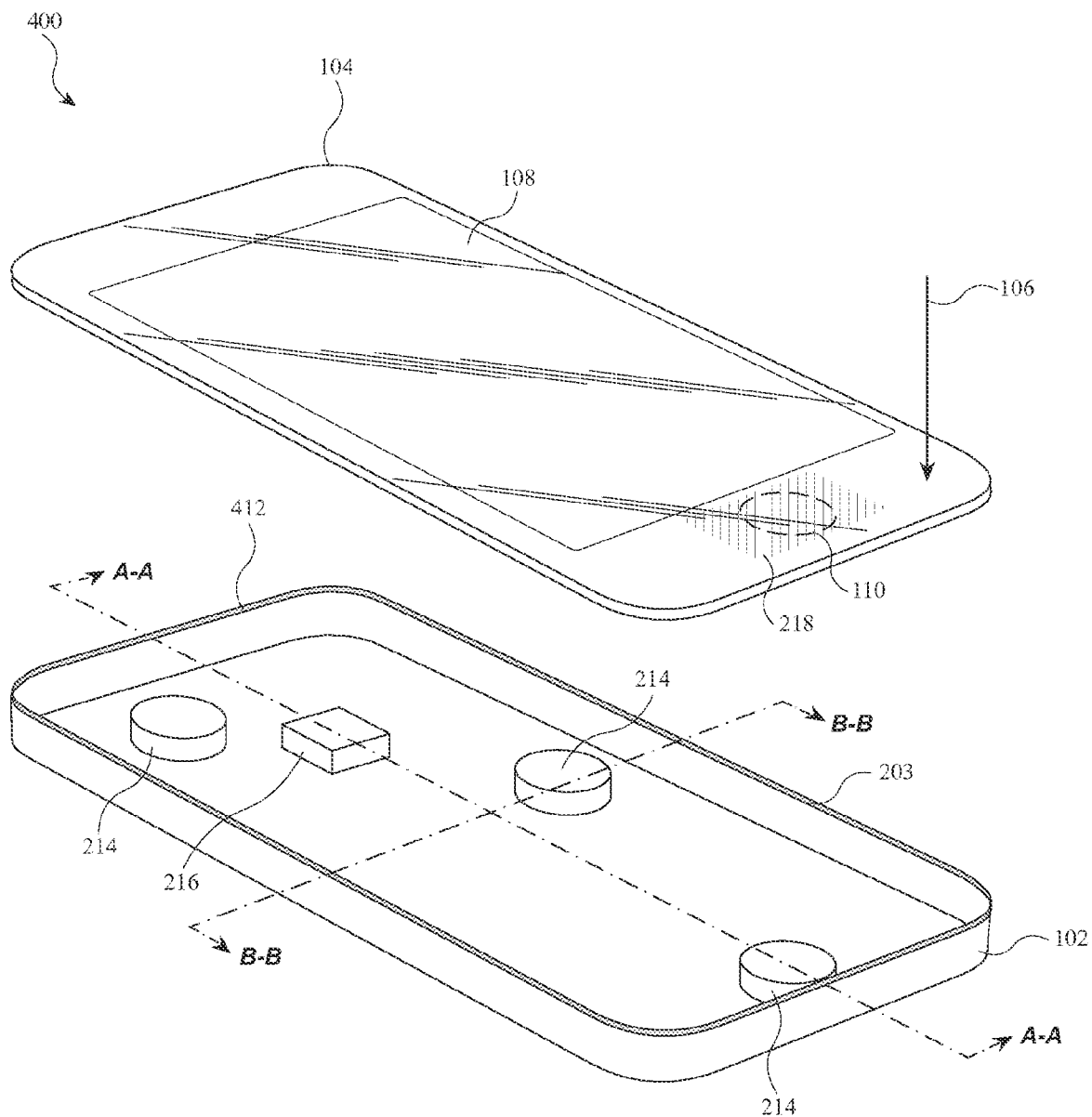
FIG. 4 is an exploded view of a third example of an electronic device in which the cover glass is configured to allow a rocking motion.

FIG. 4 is an exploded view of a third example of an electronic device 400. The electronic device 400 can include some or all of the features of the electronic devices 100 or 200 described above.

Coupling mechanism 412 couples the cover glass 104 to the perimeter of the housing 102 such that the cover glass 104 can rock in response to a force 106 applied to the cover glass 104. That is, the cover glass 104 can have one or more rotational degrees of freedom with respect to the housing, one or more translational degrees of freedom with respect to the housing, or a combination thereof, such that the cover glass 104 can move accordingly (rock) when a user presses on it. The rocking motion of the cover glass 104 gives a user a unique haptic feel and feedback system. The amount of possible rocking of the cover glass 104 can be tuned so that the rocking is detectable to a user or so that a desired user experience is achieved.

The coupling mechanism 412 can be a plurality of elastic connectors, a compliant material, or the like. By way of example, the coupling mechanism 412 could be a gasket made of rubber, soft silicone, foam, or another mid- to low-durometer material. In some embodiments, the coupling mechanism can also partially or substantially fully seal the cover glass to the housing to protect contaminants from entering the housing.

A plurality of movement detectors 214 can be disposed within the housing 102 and each can be configured to detect movement of the cover glass 104 and to generate a detection signal in response to the movement of the cover glass 104.

The processor 216 can be configured to receive the plurality of detection signals from the cover glass movement detectors 214, interpret the detection signals, and generate a control signal in accordance with the interpreted detection signals. The processor 216 can be further configured to triangulate or be otherwise programmed to determine a general or precise location of the force applied to the cover glass that resulted in the detected movements of the cover glass. Furthermore, the processor 216 can be configured or programmed to determine the nature of the movement of the cover glass 104 (up/down, left/right, forward/backward, pitching, yawing, rolling) that resulted in the detected movements of the cover glass. The processor 216 can generate a control signal in accordance with an interpretation of the location of the press, the nature of the movement detected, or a combination thereof.

Figure 5A:
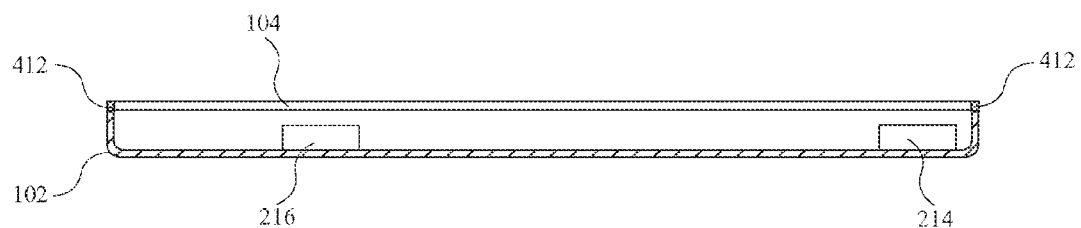
FIG. 5A is cross-sectional view of the electronic device of FIG. 4 taken along line A-A, showing the cover glass in a neutral position.

FIG. 5A is cross-sectional view of the electronic device of FIG. 4 taken along line A-A, showing the cover glass in a neutral position.

Figure 5B:
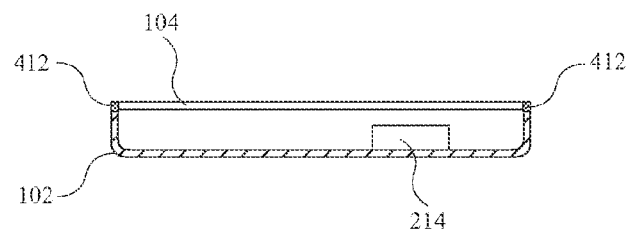
FIG. 5B is cross-sectional view of the electronic device of FIG. 4 taken along line B-B, showing the cover glass in a neutral position.

FIG. 5B is cross-sectional view of the electronic device of FIG. 4 taken along line B-B, showing the cover glass in a neutral position.

Figure 5C:
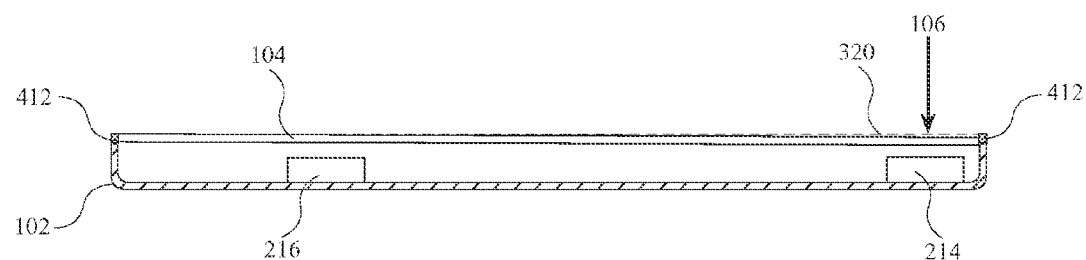
FIG. 5C is cross-sectional view of the electronic device of FIG. 4 taken along line A-A, as user force is applied thereto.

FIG. 5C is cross-sectional view of the electronic device of FIG. 4 taken along line A-A, as user force 106 is applied. The cover glass 104 is displaced from neutral position 320. In some examples, the coupling mechanism 412 can bias the cover glass 104 to return to a neutral position 320. In other examples, one or more of the movement detectors 214 can bias the cover glass 104 to return to a neutral position 320.

Figure 5D:
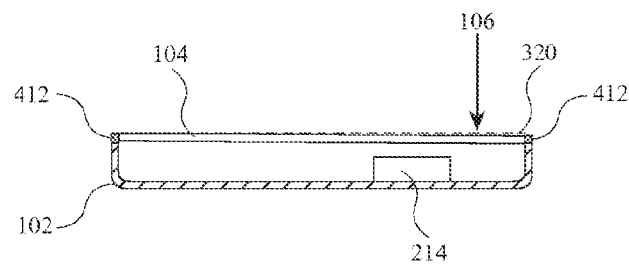
FIG. 5D is cross-sectional view of the electronic device of FIG. 4 taken along line B-B, as user force is applied thereto.

FIG. 5D is cross-sectional view of the electronic device of FIG. 4 taken along line B-B, as user force 106 is applied. The cover glass 104 is displaced from neutral position 320.

Figure 6:
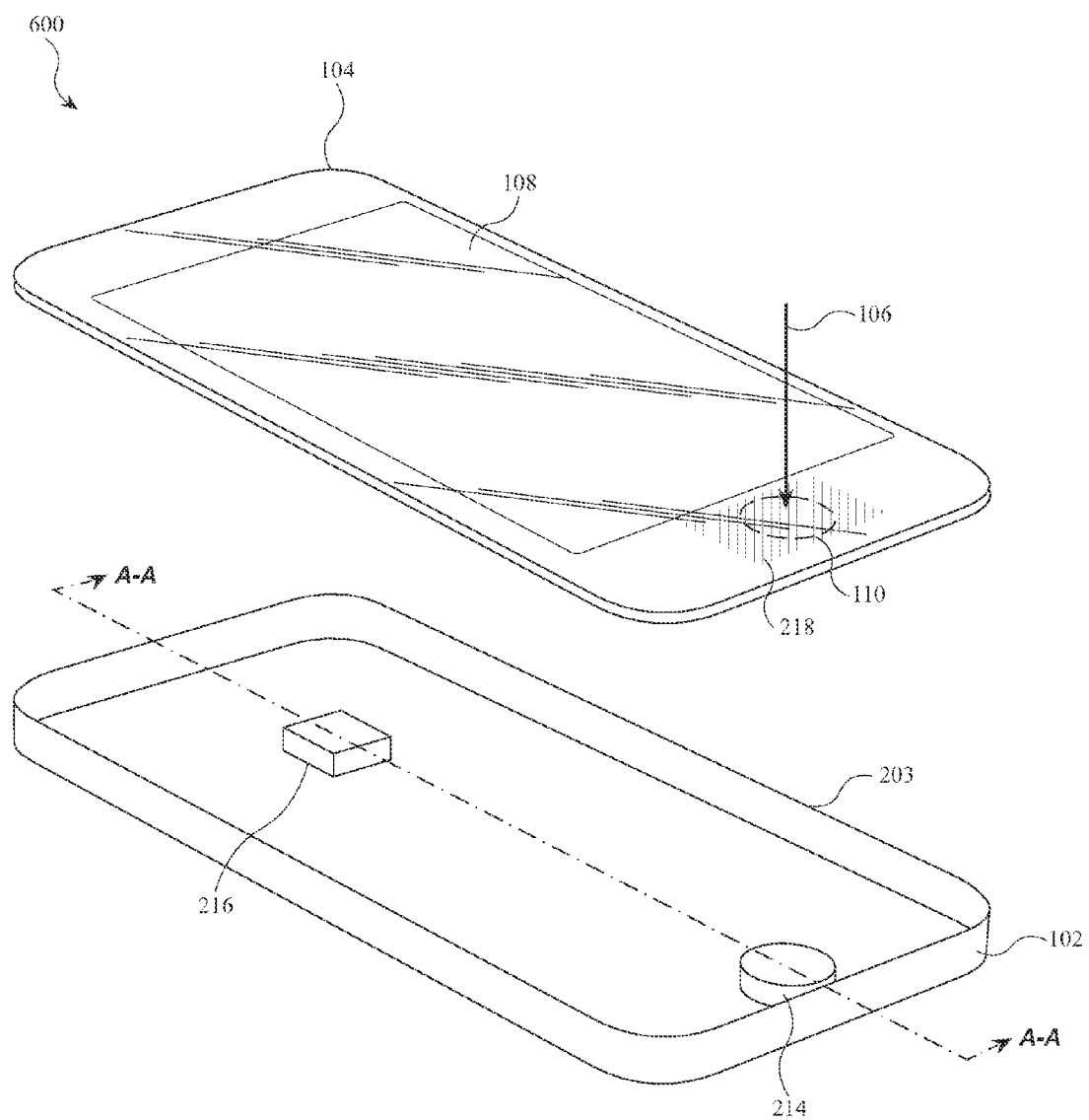
FIG. 6 is an exploded view of a fourth example of an electronic device in which the cover glass is configured so that the edges of the cover glass remain at a fixed position.

FIG. 6 is an exploded view of a fourth example of an electronic device 600 in accordance with another embodiment of the invention. The electronic device 600 can include some or all of the features of electronic devices 100, 200 and 400 described above.

Coupling mechanism 612 can couple the edges of the cover glass 104 to the housing 102 such that the edges of the cover glass 104 remains substantially fixed with respect to the edges of the housing 102 in response to a force 106 applied to a portion of the cover glass 104.

The cover glass 104 can be made from a flexible material that locally deflects in response to an applied force. In other embodiments, the cover glass 104 can be machined or otherwise manufactured to be flexible within a certain region.

The flexible nature of an interior portion of the cover glass 104 allows for a portion of the cover glass to deform or deflect with respect to a neutral position in response to a user's touch. The flexibility of the portion of the cover glass gives a user a unique haptic feel and feedback system. The amount of flexibility of the portion of the cover glass can be tuned so that the local deformation or deflection of the cover glass is detectable to a user or so that a desired user experience is achieved.

Cover glass movement detector 214 can be disposed within housing 102 and can be configured to detect the local deformation or deflection of a portion of the cover glass and generate a detection signal in response to the deformation or deflection of the cover glass. The cover glass movement detector 214 can be an optical sensor, a strain gauge, or the like. In the case that the movement detector 214 is a strain gauge, the movement detector 214 would alternatively be coupled to the rear surface of the cover glass 104. A strain gauge movement detector can be a conductive strain gauge mounted on a rear surface of a portion of the cover glass such that a deformation or deflection of the portion of the cover glass causes a change in the electrical resistance of the strain gauge. The deformation or deflection of the cover glass can thus be measured with respect to a reference datum, and if the portion of the cover glass is determined to have deformed or deflected by more than a predetermined amount, the strain gauge deflection detector can generate the detection signal.

Figure 7A:
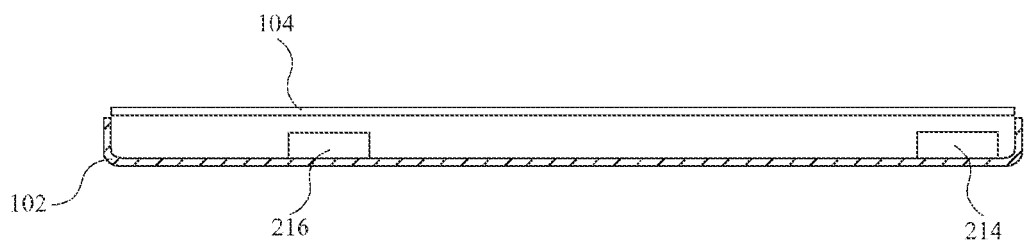
FIG. 7A is cross-sectional view of the electronic device of FIG. 6 taken along line A-A, showing the cover glass in a neutral position.

FIG. 7A is cross-sectional view of the electronic device of FIG. 6 taken along line A-A, showing the cover glass in a neutral position.

Figure 7B:
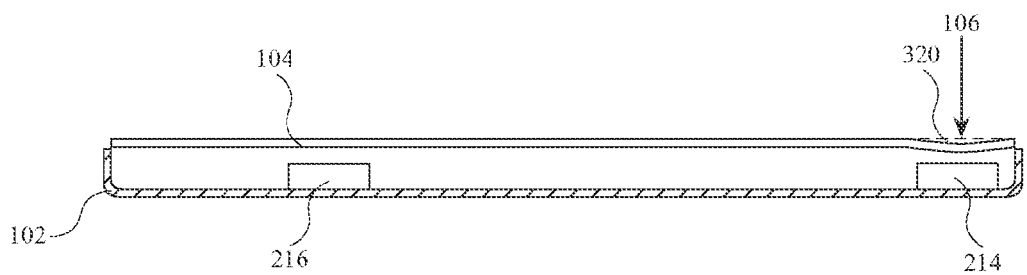
FIG. 7B is cross-sectional view of the electronic device of FIG. 6 taken along line A-A, as user force is applied thereto.

FIG. 7B is cross-sectional view of the electronic device of FIG. 6 taken along line A-A, as user force 106 is applied. The cover glass 104 is displaced from neutral position 320.

Figure 8:
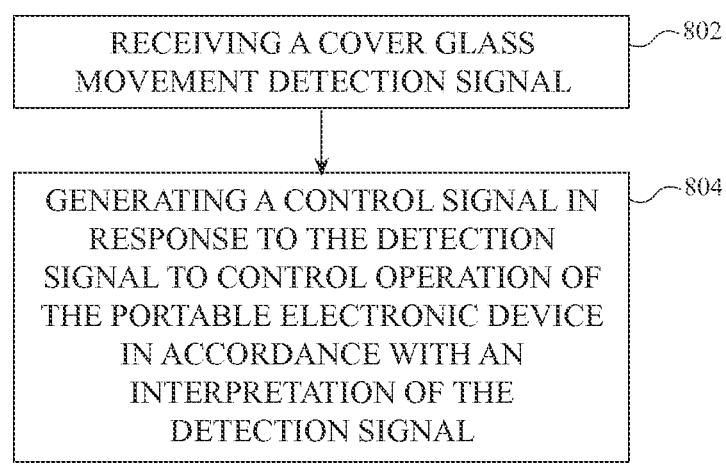
FIG. 8 provides a flowchart of a method for controlling the operation of a portable electronic device according to one embodiment of the current invention.

FIG. 8 provides a flowchart of a method for controlling the operation of a portable electronic device. It will be well understood that the provided steps are shown only for purposes of illustration and that other steps may be included in the process, as may be desired. A cover glass movement detection signal is received at step 802. A control signal is generated in response to the detection signal to control operation of the portable electronic device in accordance with an interpretation of the detection signal at step 804.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A portable electronic device comprising:
    a housing with a front opening;
    a seamless protective cover glass disposed within the front opening of the housing, wherein the cover glass forms the entire upper surface of the portable electronic device;
    a coupling mechanism configured to movably couple the housing to the cover glass such that the entire cover glass pivots as a single piece with respect to the housing in response to a force applied to the cover glass;
    a cover glass movement detector disposed within the housing, the cover glass movement detector configured to detect a pivot of the cover glass with respect to the housing and generate a detection signal in response to the pivot of the cover glass; and
    a processor disposed within the housing and in communication with the cover glass movement detector, the processor configured to receive the detection signal and generate a control signal when the detection signal is received, wherein the control signal is used to control an operation of the portable electronic device.

2. The portable electronic device of claim 1 wherein the coupling mechanism comprises a hinge coupled to the cover glass and a first edge of the housing that allows the cover glass to pivot with respect to the first edge of the housing such that a first end of the cover glass remains at the hinge and does not translate while a second edge of the cover glass opposite the first end translates downward with respect to the housing.

3. The portable electronic device of claim 2 wherein the cover glass movement detector is a dome switch comprising a flexible dome member and a switch wherein the pivot of the cover glass causes the flexible dome member to contact the switch that generates the detection signal.

4. The portable electronic device of claim 1 wherein the coupling mechanism comprises a compliant material disposed between and coupled to the cover glass and the housing such that the cover glass can rotate with respect to one or more axes, translate with respect to one or more axes, or a combination thereof.

5. The portable electronic device of claim 4 wherein the coupling mechanism comprises a plurality of elastic connectors.

6. The portable electronic device of claim 4 wherein:
the processor is configured to determine the location of the force applied to the cover glass; and
the processor is configured to generate a control signal in accordance with an interpretation of the location of the force applied to the cover glass.

7. The portable electronic device of claim 1 wherein the processor being configured to generate the control signal only when the detection signal and the capacitive touch event signal are both received prevents generating the control signal due to incidental or accidental pivot of the cover glass.

8. The portable electronic device of claim 1 wherein the housing includes walls having upper edges and the cover glass extends to the upper edges of all of the walls.

9. A method for controlling the operation of a portable electronic device having a housing that carries an operational component and a front side opening having an edge that carries a cover glass, comprising:
receiving a detection signal indicating a pivot of the cover glass with respect to the housing, wherein the cover glass forms the entire upper surface of the portable electronic device and the entire cover glass pivots as a single piece with respect to the housing; and
generating a control signal in response to receiving the detection signal to control operation of the portable electronic device in accordance with a pre-determined interpretation of the detection signal.

10. The method as recited in claim 9, wherein the pivot of the cover glass comprises: uniform movement of substantially all of the cover glass with respect to the edge.

11. The method as recited in claim 9, wherein the cover glass is fixed to the edge and the pivot of the cover glass comprises: deflection of a portion of the cover glass away from the edge.

12. The method as recited in claim 9, wherein at least a portion of the cover glass is fixed to a corresponding portion of the edge and wherein a remaining portion of the cover glass pivots with respect to the edge in response to the applied force.

13. The method as recited in claim 9, wherein the pivot of the cover glass is detected by a capacitive sensor carried by the housing and in communication with a processor.

14. A non-transitory computer readable medium for storing computer code executable by a processor used to control an operation of an electronic device having a housing that carries an operational component and a front side opening having an edge that carries a cover glass, comprising:
computer code for receiving at the processor a detection signal indicating a pivot of the cover glass with respect to the housing, wherein the cover glass forms the entire upper surface of the portable electronic device and the entire cover glass pivots as a single piece with respect to the housing; and
computer code for generating at the processor a control signal in response to receiving the detection signal to control operation of the portable electronic device in accordance with a pre-determined interpretation of the detection signal.

15. The non-transitory computer readable medium of claim 14 wherein the sensor is a dome switch comprising a flexible dome member and a switch wherein the pivot of the cover glass causes the flexible dome member to contact the switch that generates the detection signal.

16. The non-transitory computer readable medium as recited in claim 14, wherein the sensor is a capacitive sensor carried by the housing and in communication with the processor.

17. The non-transitory computer readable medium as recited in claim 14, wherein the pivot of the cover glass comprises: uniform movement of substantially all of the cover glass with respect to the edge.

18. The non-transitory computer readable medium as recited in claim 14, wherein the cover glass is fixed to the edge and the pivot of the cover glass comprises: deflection of a portion of the cover glass away from the edge.

19. An electronic device comprising:
a housing with a front opening;
a cover glass disposed at the front opening of the housing, wherein the cover glass forms the entire upper surface of the electronic device;
a coupling mechanism configured to couple the housing to the cover glass such that the cover glass pivots with respect to the housing in response to a force applied to the cover glass;
a cover glass movement detector configured to detect a pivot of the cover glass with respect to the housing and to generate a detection signal in response to the pivot of the cover glass; and
a processor in communication with the cover glass movement detector, wherein the processor is configured to receive the detection signal and to respond to the detection signal by generating a control signal that controls an operation of the electronic device.

20. The electronic device of claim 19 wherein the cover glass pivots such that a first end of the cover glass remains at a first wall of the housing and does not translate while a second edge of the cover glass opposite the first end translates downward with respect to a second wall of the housing opposite the first wall.

* * * * *